(12) United States Patent
Van Der Kruijs et al.

(10) Patent No.: US 11,224,843 B2
(45) Date of Patent: Jan. 18, 2022

(54) CROSSLINKED UNREINFORCED CELLULOSE HYDRATE MEMBRANE, METHOD FOR THE PRODUCTION THEREOF, AND USE THEREOF

(71) Applicant: Sartorius Stedim Biotech GmbH, Göttingen (DE)

(72) Inventors: Sandra Van Der Kruijs, Kassel (DE); Annette Reiche, Göttingen (DE); Gabriel Nino-Amézquita, Göttingen (DE); Louis Villain, Hannover (DE); Hans-Heinrich Hörl, Bovenden (DE); Dieter Melzner, Göttingen (DE); Franziska Bäthe, Uslar (DE)

(73) Assignee: Sartorius Stedim Biotech GmbH, Göttingen (DE)

(*) Notice: Subject to any disclaimer, the term of this patent is extended or adjusted under 35 U.S.C. 154(b) by 28 days.

(21) Appl. No.: 16/482,974

(22) PCT Filed: Dec. 1, 2017

(86) PCT No.: PCT/EP2017/081179
§ 371 (c)(1),
(2) Date: Aug. 1, 2019

(87) PCT Pub. No.: WO2018/141437
PCT Pub. Date: Aug. 9, 2018

(65) Prior Publication Data
US 2020/0230557 A1    Jul. 23, 2020

(30) Foreign Application Priority Data
Feb. 2, 2017    (DE) .............. 10 2017 000 919.8

(51) Int. Cl.
*B01D 67/00* (2006.01)
*B01D 61/14* (2006.01)
(Continued)

(52) U.S. Cl.
CPC ....... *B01D 67/0093* (2013.01); *B01D 61/145* (2013.01); *B01D 61/147* (2013.01);
(Continued)

(58) Field of Classification Search
CPC .............. B01D 67/0093; B01D 61/145; B01D 61/147; B01D 67/0095; B01D 69/02;
(Continued)

(56) References Cited

U.S. PATENT DOCUMENTS

| | | | |
|---|---|---|---|
| 5,739,316 A | * | 4/1998 | Beer ............... B01D 71/10 435/18 |
| 2008/0245736 A1 | | 10/2008 | Charkoudian et al. |
| 2011/0147292 A1 | * | 6/2011 | Demmer ............... B01J 20/285 210/198.2 |

FOREIGN PATENT DOCUMENTS

| | | |
|---|---|---|
| DE | 10 2013 017 014 A1 | 4/2015 |
| JP | H10500897 A | 1/1998 |

(Continued)

OTHER PUBLICATIONS

Office Action for Japanese Patent Application No. 2019-541413, dated Aug. 4, 2020 (w/English translation).
(Continued)

*Primary Examiner* — Krishnan S Menon
(74) *Attorney, Agent, or Firm* — Klarquist Sparkman, LLP (57) ABSTRACT

The present invention relates to a crosslinked unreinforced cellulose hydrate membrane crosslinked using at least two different crosslinking agents, to a method for the production thereof and to the use of the crosslinked unreinforced cellulose hydrate membrane according to the invention.

26 Claims, 3 Drawing Sheets

(51) Int. Cl.
    *B01D 69/02*     (2006.01)
    *B01D 71/10*     (2006.01)
    *C02F 1/44*     (2006.01)

(52) U.S. Cl.
    CPC ......... *B01D 67/0095* (2013.01); *B01D 69/02* (2013.01); *B01D 71/10* (2013.01); *C02F 1/444* (2013.01); *B01D 2323/30* (2013.01); *B01D 2325/24* (2013.01)

(58) Field of Classification Search
    CPC ................ B01D 71/10; B01D 2323/30; B01D 2325/24; B01D 2325/30; C02F 1/444
    See application file for complete search history.

(56) References Cited

FOREIGN PATENT DOCUMENTS

| | | |
|---|---|---|
| JP | 2016536114 A | 11/2016 |
| WO | WO 2007017085 A2 | 7/2006 |

OTHER PUBLICATIONS

International Search Report (ISR) and Written Opinion (with translation of the ISR) dated Feb. 23, 2018, issued by the European Patent Office in corresponding Application No. PCT/EP2017/081179.

Office Action (no English translation] received in related Chinese Application No. 201780084978.2, dated Mar. 25, 2021, 9 pages.

\* cited by examiner

CROSSLINKED UNREINFORCED CELLULOSE HYDRATE MEMBRANE, METHOD FOR THE PRODUCTION THEREOF, AND USE THEREOF

CROSS REFERENCE TO RELATED APPLICATIONS

This is the U.S. National Stage of International Application No. PCT/EP2017/081179, filed Dec. 1, 2017, which was published in English under PCT Article 21(2), which in turn claims the benefit of German Application No. DE 10 2017 000 919.8, filed Feb. 2, 2017, which is incorporated herein in its entirety.

The present invention relates to crosslinked unreinforced cellulose hydrate membranes, to a method for the production thereof and to the use of the membranes according to the invention for the filtration of aqueous media. In particular, the present invention relates to pleatable cellulose hydrate membranes which are distinguished by a reduced shrinkage and swelling behavior and also high mechanical stability in comparison with cellulose hydrate membranes from the prior art and which are suitable for membrane filter devices for sterile filtration.

In the prior art, various materials are described as base material for filtration membranes, these including cellulose hydrate membranes. Cellulose hydrate membranes have a unique combination of advantageous properties, such as hydrophilicity, which is expressed in their water-wettability without use of surfactants, low protein adsorption, high thermal resistance, and resistance to most organic solvents. However, cellulose hydrate membranes also have some disadvantages in the filtration of aqueous systems, such as, for example, the lack of resistance to strong alkaline solutions, strong acids and cellulases and also the release of so-called "pseudopyrogens".

In this context, WO 95/32793 A1 discloses a crosslinked cellulose hydrate membrane which is resistant to alkaline compounds, acids and cellulases and does not give off pseudopyrogens. The membrane is obtainable by crosslinking a regenerated cellulose hydrate membrane, i.e., a saponified cellulose acetate membrane, using a water-soluble diepoxide having a water-solubility of at least 0.2 mol/L, and mention is made of 5-ethyl-1,3-diglycidyl-5-methylhydantoin as sole water-soluble diepoxide. The crosslinking is done in aqueous alkali-metal hydroxide solutions. In this context, WO 95/32793 A1 states that, when water-soluble diepoxides are used as crosslinking agent, even high degrees of crosslinking of over 0.4 are not accompanied by any impairment of the hydrophilicity of the crosslinked cellulose hydrate membrane.

When producing cellulose hydrate filtration membranes from cellulose ester membranes, the saponification process is preferably carried out such that the porous structure of the membrane does not change as far as possible. WO 2007/017085 A2 and US 2008/0179248 A1 describe a method for producing crosslinked cellulose hydrate membranes that consists in the simultaneous saponification and crosslinking of cellulose ester membranes and is intended to be equally suitable for filtration and adsorption membranes. One of the goals of the invention described therein is the saponification and crosslinking of the cellulose ester under conditions which do not affect the structure and permeability of the membrane.

WO 2008/095709 A1 likewise discloses crosslinked cellulose hydrate membranes, which are obtainable from cellulose acetate membranes by crosslinking in alkaline medium using difunctional epoxides derived from diglycidyl ethers. On the basis of the disclosure content of the exemplary embodiments, saponification and crosslinking are done, analogously to WO 2007/017085 A2 and US 2008/0179248 A1, in a "one-pot" method. The membranes obtained are characterized in that the swelling in volume in aqueous solutions is between 40% and 250%.

US 2008/0245736 A1 discloses hydrophilic crosslinked nanofiltration membranes composed of cellulose hydrate that are resistant to polar aprotic solvents. The crosslinking is done by adding in each case a diepoxide compound derived from a diglycidyl ether, using in particular either 1,4-butanediol diglycidyl ether (BuDGE) or ethylene glycol diglycidyl ether (EDGE) without any further specification of the molecular weight or the number of ethylene-oxide repeat units of the EDGE.

EP 1 470 854 A1 discloses the production of crosslinked cellulose hydrate membranes by reaction of cellulose hydrate membranes with specific alkanediol diglycidyl ethers, for example in aqueous sodium hydroxide solution with use of BuDGE.

The crosslinked cellulose hydrate membranes disclosed in WO 95/32793 A1 are marketed by the applicant as Hydrosart® membranes, which are always nonwoven-reinforced and unsuitable for sterile filtration. As yet, an unreinforced pleatable Hydrosart® membrane does not exist. Owing to the high degree of crosslinking of said membranes, which is between 0.05 and 0.5, they are too brittle for pleatings despite a high plasticizer fraction of, for example, more than 10% by weight of glycerol. Said cellulose hydrate membranes are crosslinked discontinuously at a reaction temperature between 0° C. and 50° C. and a reaction time between 48 to 96 hours. However, this conduct of the process also leads to disadvantages with respect to membrane quality, such as, for example, the so-called "start-of-roll/end-of-roll effects", i.e., differences in flow rate and thickness of a few percent, or poor winding quality. Therefore, said membranes do not allow reliable sterile filtration. Furthermore, unreinforced membranes are required for applications in sterile filtration in order to avoid particles being given off from the reinforcement into the filtrate.

It is therefore an object of the invention to provide crosslinked unreinforced cellulose hydrate membranes which overcome the aforementioned disadvantages of the cellulose hydrate membranes known in the prior art. In particular, it is an object of the present invention to provide a crosslinked unreinforced cellulose hydrate membrane which is producible in a cost-effective manner, exhibits high consistency with regard to membrane flow rate and membrane thickness, has high mechanical stability, especially high flexibility at low plasticizer content, allows pleating without use of steam, i.e., has excellent pleatabilities, is to exhibit excellent swelling-shrinkage properties, i.e., little dimensional change upon swelling and drying with aqueous media, and to exhibit excellent winding quality, and can be used for sterile filtration after pleating.

This object is achieved by the embodiments of the present invention that are characterized in the claims.

In particular, what is provided according to the invention is a crosslinked unreinforced cellulose hydrate membrane crosslinked using at least two different crosslinking agents selected from diepoxide compounds having different spacer groups between the terminal epoxy groups, the cellulose hydrate membrane exhibiting a degree of crosslinking of 0.04 to 0.10, a dimensional change in membrane area in aqueous solutions of 25% or less and an elongation at break according to DIN EN ISO 527-1 and DIN EN ISO 527-3 at a relative air humidity of 40% to 50% and at a temperature of 23° C. to 25° C. of at least 20%.

According to the invention, the crosslinked unreinforced cellulose hydrate membrane is obtainable by a method comprising the following steps:

provision of a cellulose hydrate membrane;

crosslinking of the cellulose hydrate membrane by impregnation with a crosslinker solution and subsequent temperature increase;

rinsing of the crosslinked membrane in aqueous solutions and impregnation with a plasticizer solution, such as, for example, a glycerol-containing solution; and drying of the membrane at a temperature of 20° C. to 150° C., the crosslinking being carried out in an aqueously alkaline solution containing at least two different crosslinking agents selected from diepoxide compounds having different spacer groups between the terminal epoxy groups, and the crosslinking being carried out at a temperature of 75° C. to 150° C. for 0.1 to 60 minutes.

It was found that, surprisingly, the crosslinking of a cellulose hydrate membrane at temperatures between 75° C. and 150° C. for 0.1 to 60 minutes while using an aqueously alkaline solution and using at least two different diepoxide compounds as crosslinking agents leads to a cellulose hydrate membrane which exhibits an improved swelling and shrinkage behavior, i.e., a lower dimensional change in membrane area upon swelling with water and drying. The combination of two so different crosslinking agents and the application of a hot-crosslinking process, i.e., at high temperatures between 75° C. and 150° C. for 0.1 to 60 minutes, moreover results in a cellulose hydrate membrane which, surprisingly, exhibits a higher mechanical stability with simultaneously reduced decrease in dimensional change between the dry and wet state in comparison with cellulose hydrate membranes known in the prior art. The improved mechanical stability is expressed in particular in excellent pleating properties, since a high mechanical flexibility or high elongation at break can be obtained even at low plasticizer content and pleating is made possible even without use of steam. Moreover, the cellulose hydrate membranes according to the invention exhibit excellent winding quality.

According to the present invention, the crosslinking step uses at least two different diepoxide compounds as crosslinking agents, which are hereinafter also referred to as crosslinking agent A and crosslinking agent B. According to the invention, the crosslinking solution is an aqueous alkaline solution containing two different diepoxide compounds as crosslinking agents, which differ in the spacer group between the terminal epoxy groups. "Spacer group" is understood according to the invention to mean the unit between the terminal epoxy groups.

Particular preference is given to using glycidyl ethers of the following formula as crosslinking agent A:

where X is a branched or unbranched $C_{1-10}$ alkyl group, a branched or unbranched $C_{3-10}$ cycloalkyl group, or a substituted or unsubstituted $C_{6-20}$ aryl group.

What are preferably used as crosslinking agent B are glycidyl ethers of the following formula:

where n is 0 to 50, preferably 1 to 20, particularly preferably 3 to 10, and R is hydrogen or a branched or unbranched $C_{1-10}$ alkyl group.

Nonlimiting examples of the aforementioned diepoxides that can be mentioned are, for example, diglycidyl ether, ethylene glycol diglycidyl ether (EDGE), propylene glycol diglycidyl ether, 1,4-butanediol diglycidyl ether (BuDGE), neopentyl glycol diglycidyl ether, 1,4-cyclohexanedimethanol diglycidyl ether, resorcinol diglycidyl ether, tris(4-hydroxyphenyl)methane triglycidyl ether, trimethylolpropane triglycidyl ether, poly(ethylene glycol) diglycidyl ether or poly(propylene glycol) diglycidyl ether.

According to a preferred embodiment of the present invention, at least one alkanediol diglycidyl ether, particularly preferably BuDGE or EDGE, and at least one poly(ethylene glycol) diglycidyl ether (PEG-DGE) and/or poly(propylene glycol) diglycidyl ether (PPG-DGE) are used as crosslinking agent A and crosslinking agent B, respectively. As suitable poly(ethylene glycol) diglycidyl ether and poly(propylene glycol) diglycidyl ether, it is possible according to the invention to use those having a number of polyethylene or polypropylene repeat units $n_p$ within the range from $n_p=1$ to 30.

In a particularly preferred embodiment, the aqueous crosslinking solution contains a mixture of BuDGE and PEG-DGE.

The ratio of the at least two different diepoxide compounds and the concentration thereof in the crosslinking solution are not subject to any particular restriction. Preferably, the crosslinking solution comprises 0.01 to 0.5 mol/kg (mol of crosslinker per kilogram of solution) crosslinking agent A and 0.01 to 0.5 mol/kg crosslinking agent B, with particular preference being given to 0.05 to 0.3 mol/kg in both cases. The ratio of the different diepoxide compounds in the crosslinking solution is preferably 10-90:90-10, particularly preferably 20-80:80-20.

According to the invention, the crosslinking takes place in an aqueously alkaline solution and can take place in an aqueous medium or else in a mixture of aqueous medium and organic solvent. Preferably, the crosslinking is carried out in an aqueous medium which does not contain organic solvent.

Furthermore, it is preferred to use with the crosslinking agents a crosslinking catalyst, such as, for example, a strong base, especially sodium hydroxide (NaOH), lithium hydroxide (LiOH) and/or potassium hydroxide (KOH), in order to quicken the crosslinking of cellulose hydrate. The concentration of the crosslinking catalyst in the crosslinking solution is not subject to any particular restriction, but is preferably 0.02 to 0.2 mol/kg (mol of crosslinking catalyst per kilogram of solution), particularly preferably 0.1 to 0.15 mol/kg.

Furthermore, it is possible for the crosslinking solution to contain further additives, especially neutral salts. In this connection, the addition of a neutral salt, such as, for example, sodium chloride or sodium sulfate, to the crosslinking solution increases the reaction yield of the crosslinking reactions.

As described above, the crosslinking is, according to the invention, done at high temperatures of 75° C. to 150° C. for 0.1 to 60 minutes, with preference being given to a temperature within a range from 80° C. to about 140° C. for a crosslinking period of 0.5 to 40 minutes. Particular preference is given to a temperature of 90° C. to 130° C. for a crosslinking period of 1 to 20 minutes. The heating step can be done using an oven, a hot surface or by means of thermal radiation.

After the crosslinking, the membrane is washed neutrally with water, aqueous solutions or mildly acidic media, such as, for example, dilute 0.5% to 5% by weight acetic acid, and then washed with water to remove the soluble constituents. Thereafter, the membrane obtained is impregnated with a plasticizer solution, for example with a glycerol-containing solution of 0.5% to 30% by weight glycerol.

The cellulose hydrate membrane according to the invention that is obtained after the crosslinking step exhibits a degree of crosslinking of 0.04 to 0.10. As a measure of the degree of crosslinking (DX), which can assume the value of 3 at the most, what is chosen according to the invention is the average degree of substitution of the anhydroglucose units of the cellulose, hereinafter called semi-cellobiose unit, as a result of reaction with the crosslinking agent, as described on the basis of the following equation:

$$DX = N_{CL} \times [n_{CLtot}/(n_{CLtot} + n_{(1/2)Cellobiose})]$$

where $n_{(1/2)Cellobiose} = m_{NetCHM}/M_{(1/2)Cellobiose}$ and where $$n_{CLtot} = (m_{NetCHMx} - m_{NetCHM})/[[(m_{CL1}/(m_{CL1} + m_{CL2})) \times M_{CL1}] + [(m_{CL2}/(m_{CL1} + m_{CL2})) \times M_{CL2}]],$$

where $n_{CLtot}$ is the amount of substance in mol of the total crosslinking agent (hereinafter also called crosslinker) and $n_{(1/2)Cellobiose}$ is the amount of substance in mol based on the semi-cellobiose unit of the cellulose hydrate membrane used; $m_{NetCHM}$ is the dry mass of the cellulose hydrate membrane used in g and $M_{(1/2)Cellobiose}$ is the molar mass of the semi-cellobiose unit (162 g/mol) and $N_{CL}$ corresponds to the number of reactive groups per crosslinker molecule; $m_{NetCHMx}$ is the dry mass of the crosslinked cellulose hydrate membrane in g and $m_{NetCHM}$ is the mass of the cellulose hydrate membrane (starting membrane) in g. The amount of substance of the crosslinkers is calculated from the difference in dry mass between the crosslinked membrane $m_{NetCHMx}$ and the starting membrane $m_{NetCHM}$, and from the molar masses $M_{CL1}$ and $M_{CL2}$ in g/mol and from the mass fractions of the crosslinkers $m_{CL1}$ and $m_{CL2}$ that are used in the reaction solution. The crosslinker molecules used for the production of the membrane according to the invention contain two reactive groups, i.e., the terminal epoxy groups, per crosslinker molecule, meaning that $N_{CL}$ is equal to two.

On the basis of the three hydroxyl groups of the semi-cellobiose unit, the maximum theoretically possible value of DX is 3. Preferably, the degree of crosslinking DX is at least 0.045, more preferably at least 0.05. According to the invention, the upper limit for the degree of crosslinking DX is 0.10. Although it is possible with higher degrees of crosslinking to achieve a higher mechanical and chemical stability of the membrane, this leads to a hardening of the membrane material and consequently to an increased brittleness. To ensure the pleatability of such brittle membranes, there is a disadvantageous need for a high plasticizer fraction and/or a reinforcement.

According to the invention, the crosslinked cellulose hydrate membrane also has, as unreinforced membrane, excellent pleatabilities.

According to the present invention, the dimensional change in membrane area of the cellulose hydrate membrane in aqueous solutions is 25% or less, preferably 20% or less, particularly preferably 19% or less. According to the invention, the dimensional change in membrane area (swelling and shrinkage behavior) is determined by the measurement of the dimensions length and width of the unreinforced crosslinked cellulose hydrate membranes previously completely wetted with water. Afterwards, the dimensions are measured again after drying at 140° C. until there is a constant weight. The dimensional change (DF) in membrane area is determined on the basis of the following equation:

$$DF[\%] = ((a_2 \times b_2/a_1 \times b_1) - 1) \times 100$$

where $a_1$ and $b_1$ are the length and width of the dried membrane and $a_2$ and $b_2$ are the length and width of the membrane wetted with water.

A further feature of the membrane according to the invention is that the elongation at break according to DIN EN ISO 527-1 and DIN EN ISO 527-3 at a relative air humidity of 40% to 50% and at a temperature of 23° C. to 25° C. is at least 20%. Preferably, the lower limit of the elongation at break is 25%, with particular preference being given to 26%. The elongation at break is determined on the basis of the method according to DIN EN ISO 527-1 and DIN EN ISO 527-3 as described in Example 1. The specified values for elongation at break are the mean values of, in each case, 4 measurements along and across the pulling direction of the membrane.

According to a preferred embodiment of the present invention, the cellulose hydrate membrane is a microfiltration membrane or ultrafiltration membrane. Particularly preferably, the membrane according to the invention is a microfiltration membrane having a mean flow pore size within the range from 0.1 to 10 μm. Particular preference is given to a sterile-filtration membrane having a mean flow pore size of 0.1 to 0.6 μm. The mean flow pore size is determined on the basis of the method described in Example 1.

According to a further preferred embodiment of the present invention, the cellulose hydrate membrane is pleated and is present as unreinforced pleated membrane.

The present invention further provides a method for producing the crosslinked unreinforced cellulose hydrate membrane according to the invention. The above remarks with regard to the crosslinked cellulose hydrate membrane according to the invention therefore also apply to the production method according to the invention.

The method according to the invention for producing a crosslinked unreinforced cellulose hydrate membrane comprises the following steps:

provision of a cellulose hydrate membrane; and subsequent crosslinking of the cellulose hydrate membrane by impregnation with a crosslinker solution and subsequent temperature increase, the crosslinking being carried out in an aqueously alkaline solution containing at least two different crosslinking agents selected from diepoxide compounds having different spacer groups between the terminal epoxy groups, and the crosslinking being carried out at a temperature of 75° C. to 150° C. for 0.1 to 60 minutes;

subsequent removal of excess reactants and soluble reaction products by rinsing in aqueous solutions and subsequent impregnation with a plasticizer solution, for example glycerol solution; and subsequent drying of the membrane, the drying being carried out at a temperature of 20° C. to 150° C.

Particularly preference is given to the reaction steps of a continuous production process.

The starting material used for the cellulose hydrate membrane according to the invention can be a cellulose hydrate membrane which, for example, can be obtained from a cellulose ester membrane, involving contacting the cellulose ester membrane with at least one aqueous solution in a saponification reaction under conditions which lead in situ to the hydrolysis (saponification) of the ester groups to form hydroxyl groups, resulting in the formation of a cellulose hydrate membrane.

Thus, according to a preferred embodiment of the method according to the invention, the cellulose hydrate membrane is obtained beforehand by saponification of a cellulose ester membrane in an aqueous medium.

As explained above, the cellulose hydrate membrane is hot-crosslinked separately using at least two different diepoxide compounds as crosslinking agents. The saponification step and the crosslinking step are consequently not carried out simultaneously, but in separate method steps.

In a preferred embodiment, the starting membrane, i.e., the cellulose hydrate membrane, can be obtained by saponification of a cellulose ester membrane having a pore diameter of 0.1 to 10 µm, preferably 0.1 to 5 µm and more preferably of 0.1 to 0.6 µm, and a thickness of 50 to 150 µm, the cellulose ester membrane having been produced by a customary production method known in the specialist field. The pore diameter is determined by carrying out a capillary flow porometry test. Further details can be gathered from the operation instructions for the Porolux 500 from Porometer, or are described in Example 1.

Cellulose ester membranes can be constructed from cellulose monoacetate, cellulose diacetate, cellulose triacetate, cellulose propionate, cellulose butyrate and cellulose acetate butyrate or other suitable cellulose esters or cellulose nitrate, methylcellulose or ethylcellulose, and also mixtures thereof, with preference being given to cellulose acetates, especially cellulose diacetate. A person skilled in the art is aware that the cellulose ester membrane can in part also contain hydroxyl groups in addition to the ester groups.

Before the saponification, the cellulose ester membrane can optionally be pretreated in a suitable medium. The temperature in the pretreatment step is preferably within a range from 10° C. to 100° C., with particular preference being given to a temperature within a range from about 15° C. to about 40° C. The pretreatment medium can be a gas, such as air for example, an organic solvent, such as an alcohol for example, or an aqueous medium, with preference being given to an aqueous medium.

The duration of the pretreatment has no substantial influence on the pretreatment effect so long as there is application of a minimum duration of action that ensures a temperature adjustment of the cellulose ester membrane in the pretreatment medium. The pretreatment can be ended by rinse-out of the pretreatment medium from the membrane using demineralized water.

The optionally pretreated cellulose ester membrane is saponified using a suitable saponification medium, resulting in the formation of the cellulose hydrate membrane. Depending on the wetting properties, the cellulose ester membrane can be used dry or wet in the saponification step.

The cellulose ester membrane is saponified in a saponification medium. Particular preference is given to using an aqueous saponification medium having a pH of >7. The saponification medium preferably comprises an alkaline compound, by preference an alkali metal hydroxide. Particular preference is given to using an aqueous solution of sodium hydroxide, potassium hydroxide or lithium hydroxide. According to a particularly preferred embodiment of the present invention, an aqueous sodium hydroxide-containing and/or potassium hydroxide-containing solution is used, the concentration of the sodium hydroxide and/or potassium hydroxide in the saponification medium being within a range from 0.1 to 5 mol/kg, particularly preferably within a range from 0.1 to 0.6 mol/kg.

Preferably, the basic saponification medium (aqueous NaOH and/or KOH) additionally contains a salt, such as, for example, potassium carbonate in a concentration of 0.1 to 5 mol/kg. The temperature of the medium used in the saponification step can be from about 10° C. up to the boiling point of the saponification medium, with preference being given to a temperature within a range from 15° C. to about 50° C.

The saponification period is determined by the composition of the saponification medium and the saponification temperature. Usually, the saponification period is 0.1 to 60 minutes, with preference being given to a saponification period of 5 to 30 minutes.

Thereafter, in this preferred embodiment of the method according to the invention, the saponified cellulose acetate membrane obtained is, as already described above, crosslinked using at least two different crosslinking agents. With regard to the exact description of this crosslinking step according to the invention, reference is made to the relevant remarks above.

As described above, the crosslinked cellulose hydrate membrane obtained can additionally be treated with a glycerol-containing solution of 0.5% to 30% by weight glycerol. According to the present invention, it is advantageously possible to produce an unreinforced pleated cellulose hydrate membrane having a low plasticizer content. Owing to the improved mechanical stability of the membrane according to the invention, the plasticizer content, for example in the form of glycerol, is especially less than 10% by weight, more preferably less than 8% by weight. According to a preferred embodiment, the production method according to the invention further so comprises the step of pleating of the crosslinked cellulose hydrate membrane. Proceeding from the inventive properties of the membrane, it is furthermore possible for the pleating to be done without use of steam.

The membranes according to the invention composed of crosslinked cellulose hydrate can be produced as planar membrane and be fitted in corresponding modules. As described above, the cellulose hydrate membranes according to the invention are especially suitable for pleating, even though they are unreinforced.

The application area of the membranes according to the invention extends to any filtration of aqueous media. For example, this is the case for the filtration of aqueous media of biological and biotechnological origin.

The present invention will be more particularly elucidated on the basis of the following nonlimiting examples, the graphs depicted in FIGS. 1a to 3b outlining the properties of the membranes obtained.

FIGS. 2a and 2b depict the dimensional change of the uncrosslinked cellulose (hydrate) membrane.

FIGS. 3a and 3b depict the elongation at break of the uncrosslinked cellulose (hydrate) membrane.

REAGENTS USED

Reverse-osmosis water, conductivity<2 µS/cm, piped supply
Sodium hydroxide solution, 1 N in water, [1310-73-2], Sigma Aldrich
BuDGE (1,4-butanediol diglycidyl ether), [2425-79-8], technical grade, Ems Chemie,
PEG-500-DGE (poly(ethylene glycol) diglycidyl ether), [72207-80-8], Sigma-Aldrich
Glycerol, 85%, [56-81-5], Sigma-Aldrich
Potassium hydroxide solution, 50% in water, [1310-58-3], Carl-Roth
Potassium carbonate, 99% p.a., [584-08-7], Carl-Roth
Cellulose Acetate Starting Membrane, Sartorlus-Stedim-Blotech R&D
  Bubble point, visually with water (according to DIN 58355), upstream side band side, 3.6-3.8 bar,
  Flow rate for water according to DIN 58355: 20-25 ml/(min per $cm^2_{Membrane}$ per bar)
  Thickness 185-195 µm (method according to DIN 53105)
Cellulose Hydrate Starting Membrane, Sartorius-Stedim-Blotech R&D
  Bubble point, visually with water (according to DIN 58355), upstream side band side, 4.4-4.6 bar,
  Flow rate for water according to DIN 58355: 25-30 ml/(min per $cm^2_{Membrane}$ per bar)
  Thickness 95-105 µm (method according to DIN 53105)

Example 1: (Short Name: C90-20)

One sheet of 40×22 cm gross dimension, including weighing-down strips, of an unreinforced cellulose hydrate membrane was cut from a membrane roll. The net dimension of 29.7×22 cm was marked and was used for all later measurements. The weighing-down strips were removed after the reaction. The longer side of the sheet is always the processing direction of the starting membrane roll. After weight determination, the sheet was impregnated in an impregnation solution of the composition 0.1 mol/kg BuDGE, 0.1 mol/kg PEG-500-DGE and 0.125 mol/kg NaOH for 60 s in a plastic tray. The impregnated sheet was immediately heated at 90° C. for 20 min on a heatable stainless-steel plate bonded with Teflon film. At the same time, the edge regions on two sides were held in place with weights, these weighing-down strips not being included in the calculation of the dimensional change. To minimize evaporation effects due to room conditions, a semi-closed hood was placed above the plate. Thereafter, the sheet was washed neutrally with water and the dimensions (length and width) of the membrane were measured. After the sheet had been dried at room temperature until there was a constant weight, length and width were measured again and the weight was determined.

The equilibrium water content of starting membrane and of the membrane according to the invention was 10%. These contents were subtracted from the total mass. The degree of crosslinking was calculated by using the increase in mass.

For the tensile measurements, the membrane was, in a further step, impregnated in a solution of 5% by weight glycerol for 3 min and dried at room temperature. Strips of 1.5×10 cm along and across the production direction of the starting membrane were cut. Since the moisture content has an effect on the properties in the tensile test, all samples were stored together in a PE bag for at least two weeks.

The tensile measurement was done following DIN EN ISO 527-1 and DIN EN ISO 527-3 at a relative air humidity of 40-50% and at a temperature of 23-25° C., force transducer 200 N, clamping length at start position 50 mm, a sample width of 15 mm and at a test speed of 5 mm/min.

The mean flow pore size was determined using capillary flow porometry, by means of the Porolux 500 instrument from Porometer, with Porofil wetting liquid of surface tension 16 dyne/cm, a contact angle of 0° and the shape factor of 0.715 at a rate of 2000 s/bar and 400 data points within the measurement interval of 0.6 bar. The sample size was 25 mm in diameter, as sample holder SH 25. A wet curve was recorded first, followed immediately by a dry curve. The criterion for the bubble point was the setting "first flow". The exact procedure and the calculations carried out by the instrument software can be gathered from the operating instructions of the Porolux 500.

The sterile-filtration capacity was determined by means of the bacterial challenge test according to DIN 58 355 at a bacterial concentration of >$10^7$/$cm^2$ filter area using the test microbe Brevundimonas diminuta. The bacterial retention of the pleated and unpleated membrane was always 100%. The sterile-filtration capacity was thus demonstrated.

Example 2: (Short Name: D90-20)

Production as in example 1, using an impregnation solution having the following composition: 0.15 mol/kg BuDGE, 0.05 mol/kg PEG-500-DGE and 0.125 mol/kg NaOH.

Example 3: (Short Name: E90-20)

Execution as in example 1, using an impregnation solution having the following composition: 0.05 mol/kg BuDGE, 0.15 mol/kg PEG-500-DGE and 0.125 mol/kg NaOH.

Comparative Example 1: (Short Name: A90-20)

Execution as in example 1, using an impregnation solution having the following 30 composition: 0.2 mol/kg BuDGE and 0.125 mol/kg NaOH.

Comparative Example 2: (Short Name: B90-20)

Execution as in example 1, using an impregnation solution having the following composition: 0.2 mol/kg PEG-500-DGE and 0.125 mol/kg NaOH.

Comparative Example 3-24: (Short Name: C24)

One sheet of 30×21 cm dimension of unreinforced cellulose hydrate membrane was cut from a membrane roll. The longer side of the sheet is always the processing direction of the starting membrane roll. After weight determination, the sheet was impregnated in an impregnation solution of the composition 0.1 mol/kg BuDGE, 0.1 mol/kg PEG-500-DGE and 0.125 mol/kg NaOH for 60 s in a plastic tray. The impregnated sheet was immediately packed into a suitable film and stored at room temperature for 24 h; this is the reaction time. Thereafter, the sheet was washed neutrally with water and the dimensions (length and width) of the membrane were measured. After the sheet had been dried at room temperature until there was a constant weight, length and width were measured again and the weight was determined.

Comparative Example 3-72: (Short Name: C72)

Execution as in comparative example 3-24, the reaction time at room temperature being, however, 72 h.

Comparative Example 3-120: (Short Name: C120)

Execution as in comparative example 3-24, the reaction time at room temperature being, however, 120 h.

Comparative Example 4-24: (Short Name: D24)

Execution as in comparative example 3-24, using an impregnation solution having the following composition: 0.15 mol/kg BuDGE, 0.05 mol/kg PEG-500-DGE and 0.125 mol/kg NaOH.

Comparative Example 4-72: (Short Name: D72)

Execution as in comparative example 4-24, the reaction time at room temperature being, however, 72 h.

Comparative Example 4-120: (Short Name: D120)

Execution as in comparative example 4-24, the reaction time at room temperature being, however, 120 h.

Comparative Example 5-24: (Short Name: E24)

Execution as in comparative example 3-24, using an impregnation solution having the following composition: 0.05 mol/kg BuDGE, 0.15 mol/kg PEG-500-DGE and 0.125 mol/kg NaOH.

Comparative Example 5-72: (Short Name: E72)

Execution as in comparative example 5-24, the reaction time at room temperature being, however, 72 h.

Comparative Example 5-120: (Short Name: E120)

Execution as in comparative example 5-24, the reaction time at room temperature being, however, 120 h.

Comparative Example 6-24: (Short Name: A24)

Execution as in comparative example 3-24, using an impregnation solution having the following composition: 0.2 mol/kg BuDGE and 0.125 mol/kg NaOH.

Comparative Example 6-72: (Short Name: A72)

Execution as in comparative example 6-24, the reaction time at room temperature being, however, 72 h.

Comparative Example 6-120: (Short Name: A120)

Execution as in comparative example 6-24, the reaction time at room temperature being, however, 120 h.

Comparative Example 7-24: (Short Name: B24)

Execution as in comparative example 3-24, using an impregnation solution having the following composition: 0.2 mol/kg PEG-500-DGE and 0.125 mol/kg NaOH.

Comparative Example 7-72: (Short Name: B72)

Execution as in comparative example 7-24, the reaction time at room temperature being, however, 72 h.

Comparative Example 7-120: (Short Name: 8120)

Execution as in comparative example 7-24, the reaction time at room temperature being, however, 120 h.

Comparative Example 8: (Short Name: C55-30)

Execution as in example 1, the reaction time being 30 min at 55° C.

Example 4: (Short Name: C80-30)

Execution as in example 1, the reaction time being 30 min at 80° C.

Comparative Example 9-1: (Short Name: C Ge75-7)

(Execution as described in WO 2008/095709 A1)

Two sheets of 11×17 cm dimension of unreinforced cellulose acetate membrane were cut from a membrane roll and the weight was determined. An impregnation solution of the composition 718.54 mL water and 71.85 g sodium sulfate was heated to 75° C. followed by addition of 0.093 mol each of the epoxide compounds BuDGE and PEG-500-DGE and by vigorous stirring of the solution for 5 min. The membrane sheets were fixed in a polyolefin mesh and placed into the beaker containing the impregnation solution. Nine portions of 1.257 mL of 50% NaOH were added at an interval of, in each case, 20 min and the solution was stirred at the reaction temperature of 75° C. for 7 h. The reaction was ended by rinsing the membrane in water until the pH was neutral and by drying at room temperature.

Comparative Example 9-2: (Short Name: C Ge85-7)

Execution as in comparative example 9-1, the reaction temperature being 85° C.

The above-described production parameters of the examples and comparative examples are summarized in Table 1.

TABLE 1

|  | Short name | Conc. BuDGE [mol/kg] | Conc. PEG-500-DGE [mol/kg] | Reaction temp. [° C.] | Reaction time [h] | Method |
| --- | --- | --- | --- | --- | --- | --- |
| Example 1 | C90-20 | 0.10 | 0.10 | 90 | 0.33 | Hot |
| Example 2 | D90-20 | 0.15 | 0.05 | 90 | 0.33 | Hot |
| Example 3 | E90-20 | 0.05 | 0.15 | 90 | 0.33 | Hot |
| Example 4 | C80-30 | 0.10 | 0.10 | 80 | 0.5 | Hot |
| Comp. ex. 1 | A90-20 | 0.20 | — | 90 | 0.33 | Hot |
| Comp. ex. 2 | B90-20 | — | 0.2 | 90 | 0.33 | Hot |
| Comp. ex. 3-24 | C24 | 0.10 | 0.10 | RT (20-25) | 24 | Cold |
| Comp. ex. 3-72 | C72 | 0.10 | 0.10 | RT (20-25) | 72 | Cold |
| Comp. ex. 3-120 | C120 | 0.10 | 0.10 | RT (20-25) | 120 | Cold |
| Comp. ex. 4-24 | D24 | 0.15 | 0.05 | RT (20-25) | 24 | Cold |
| Comp. ex. 4-72 | D72 | 0.15 | 0.05 | RT (20-25) | 72 | Cold |
| Comp. ex. 4-120 | D120 | 0.15 | 0.05 | RT (20-25) | 120 | Cold |
| Comp. ex. 5-24 | E24 | 0.05 | 0.15 | RT (20-25) | 24 | Cold |
| Comp. ex. 5-72 | E72 | 0.05 | 0.15 | RT (20-25) | 72 | Cold |
| Comp. ex. 5-120 | E120 | 0.05 | 0.15 | RT (20-25) | 120 | Cold |
| Comp. ex. 6-24 | A24 | 0.20 | — | RT (20-25) | 24 | Cold |
| Comp. ex. 6-72 | A72 | 0.20 | — | RT (20-25) | 72 | Cold |
| Comp. ex. 6-120 | A120 | 0.20 | — | RT (20-25) | 120 | Cold |
| Comp. ex. 7-24 | B24 | — | 0.20 | RT (20-25) | 24 | Cold |
| Comp. ex. 7-72 | B72 | — | 0.20 | RT (20-25) | 72 | Cold |
| Comp. ex. 7-120 | B120 | — | 0.20 | RT (20-25) | 120 | Cold |
| Comp. ex. 8 | C55-30 | 0.10 | 0.10 | 55 | 0.5 | Hot |
| Comp. ex. 9-1 | C GE75-7 | 0.10 | 0.10 | 75 | 7 | One-pot |
| Comp. ex. 9-2 | C GE85-7 | 0.10 | 0.10 | 85 | 7 | One-pot |

Discussion of the Results

Figure 1A:
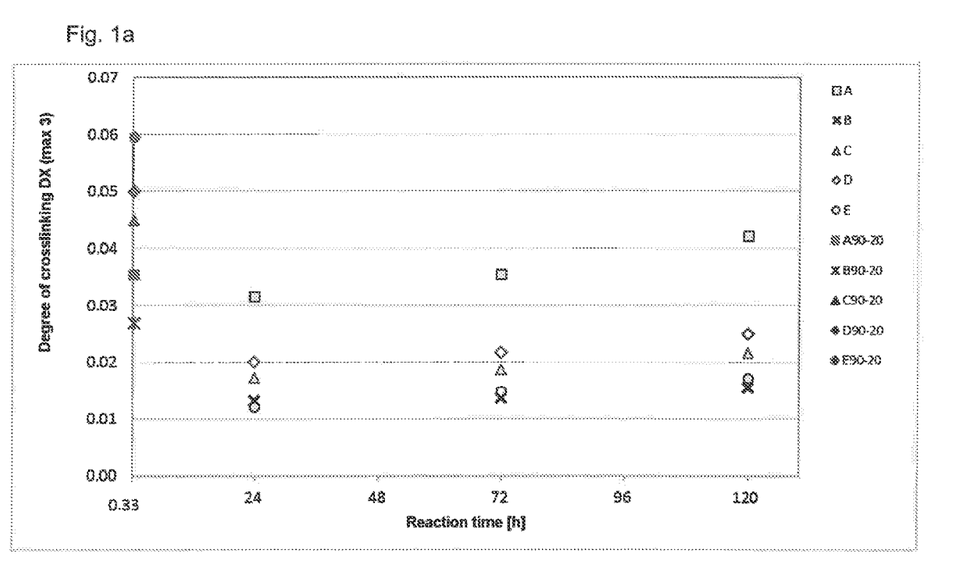
FIGS. 1a and 1b show the degree of crosslinking DX of the crosslinked membranes as a function of the reaction time, examples 1 to 3 (C90-20 to E90-20), comparative examples 1 and 2 (A90-20 and B90-20) and the comparative examples of cold method A-E being depicted in FIG. 1a and examples 1 to 4 (C90-20 to E90-20 and C80-30) and comparative examples 8, 9-1 and 9-2 being depicted in FIG. 1b.
Figure 1B:
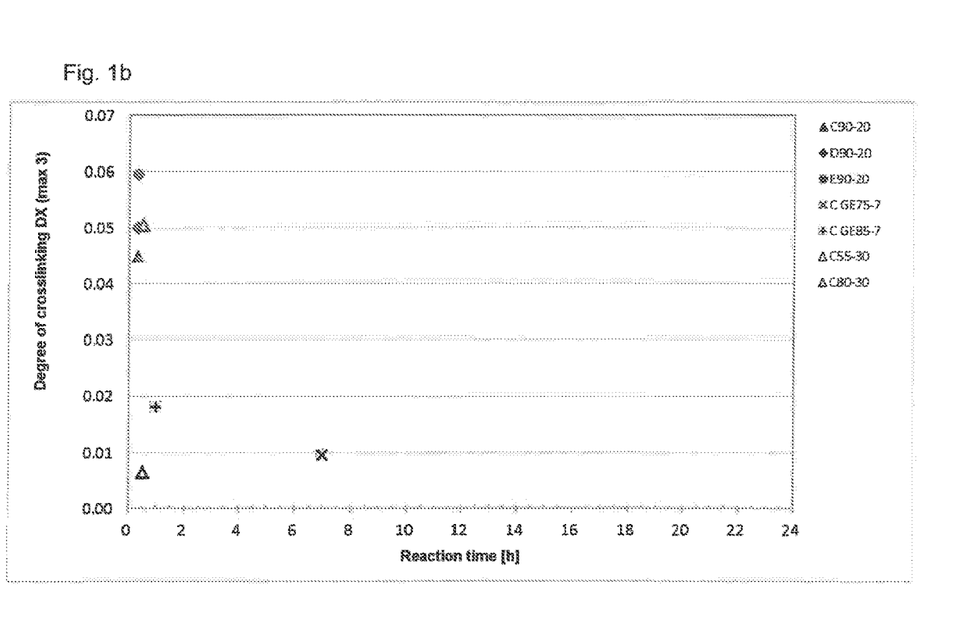
Figure 2A:
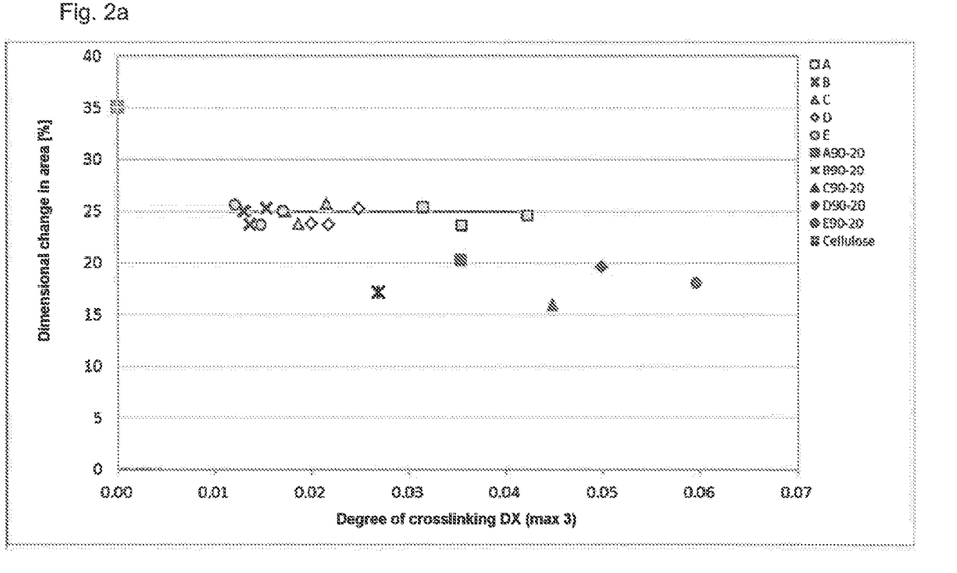
FIGS. 2a and 2b show the dimensional change in membrane area (swelling and shrinkage behavior) of the crosslinked membranes as a function of the degree of crosslinking DX, examples 1 to 3 (C90-20 to E90-20), comparative examples 1 and 2 (A90-20 and B90-20) and the comparative examples of cold method A-E being depicted in FIG. 2a and examples 1 to 4 (C90-20 to E90-20 and C80-30) and comparative examples 8, 9-1 and 9-2 being depicted in FIG. 2b. Furthermore.
Figure 2B:
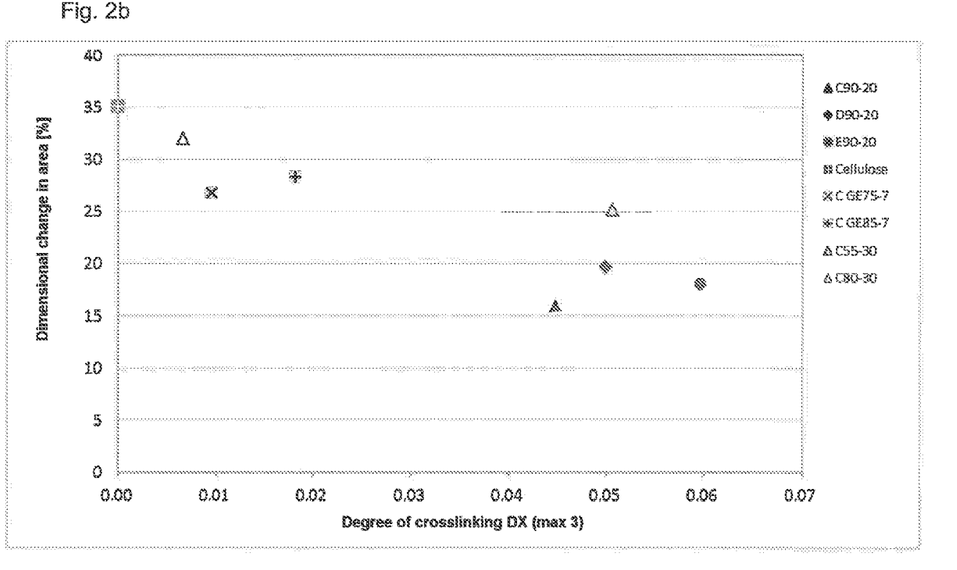

As is clearly apparent in FIG. 1, the maximum degree of crosslinking can be achieved with BuDGE in the case of the crosslinking in the cold-crosslinking method (wet method) at room temperature. The degrees of crosslinking with PEG-500-DGE are distinctly lower. The degrees of crosslinking achieved by the mixtures are dominated by the proportion of BuDGE, since the crosslinker PEG-500-DGE is barely reactive in the wet method.

In contrast, the hot-crosslinking method according to the invention with only, in each case, one of the two crosslinkers BuDGE or PEG-500-DGE leads to the approximately same degree of crosslinking and thus comparable reactivity of the crosslinkers. Surprisingly, this is further distinctly surpassed by the mixtures containing both crosslinkers BuDGE and PEG-500-DGE. In line with the higher degree of crosslinking, the membranes exhibit a low swelling and shrinkage behavior and thus an altogether lower dimensional change in area, as outlined in FIGS. 2a and 2b.

Figure 3A:
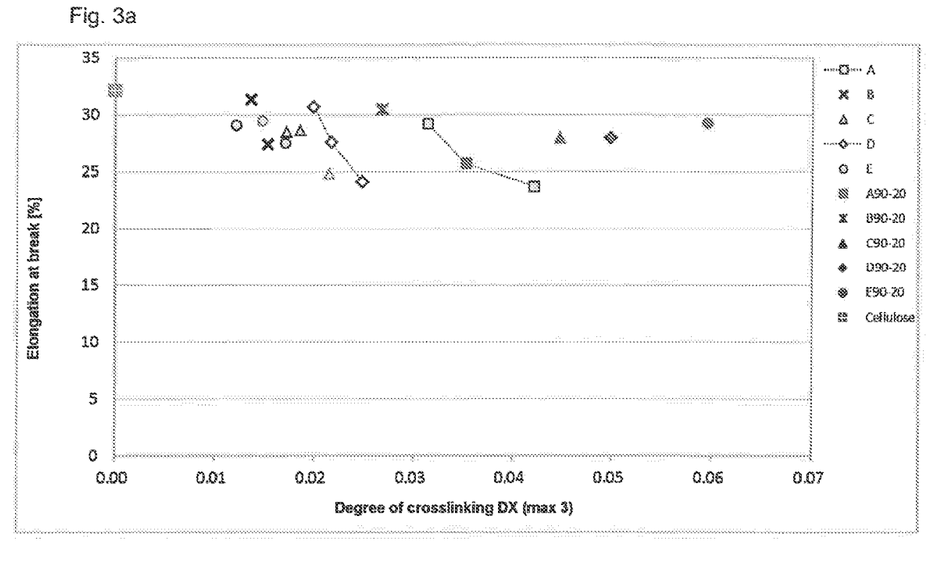
FIGS. 3a and 3b show the elongation at break as a function of the degree of crosslinking DX, examples 1 to 3 (C90-20 to E90-20), comparative examples 1 and 2 (A90-20 and B90-20) and the comparative examples of cold method A-E being depicted in FIG. 3a and examples 1 to 4 (C90-20 to E90-20 and C80-30) and comparative examples 8, 9-1 and 9-2 being depicted in FIG. 3b. Moreover.
Figure 3B:
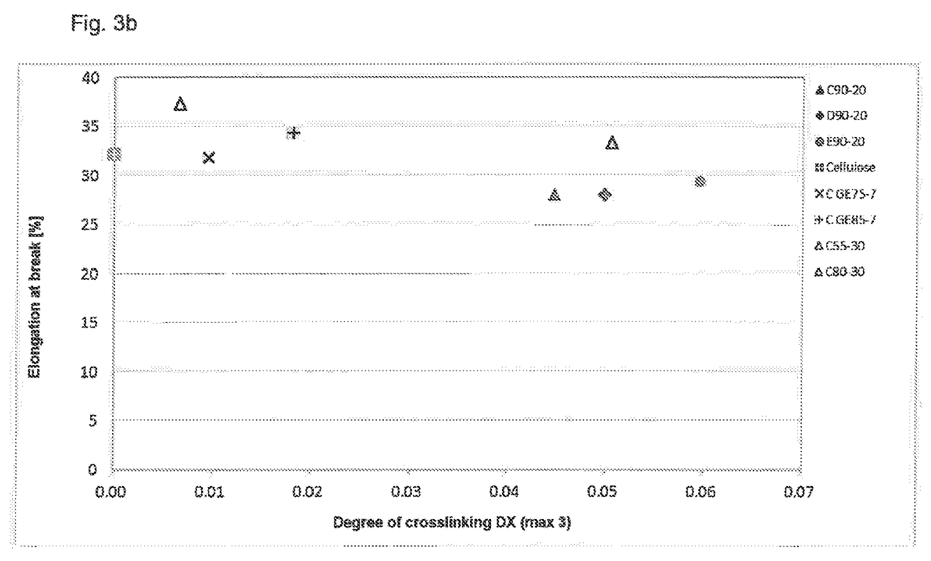

The elasticity, demonstrated by the greater elongation at break in the tensile test of the hot-crosslinked membranes using the mixtures of the two crosslinkers, is surprisingly, despite the higher degree of crosslinking, the same as or higher than that of the membranes produced in the wet method or in the hot method with only one crosslinker, as can be seen in FIGS. 3a and 3b.

The use of a crosslinker mixture in combination with hot-crosslinking is thus found to be particularly advantageous for producing pleatable membranes. The production of the crosslinked cellulose hydrate membranes can particularly advantageously be carried out in accordance with the method according to the invention. The production of crosslinked cellulose hydrate membranes in a one-pot method— see comparative examples 9-1 and 9-2—and at a lower reaction temperature of 55° C. does not lead to the desired degree of crosslinking (as is apparent from FIG. 1b) and also does not lead to the desired dimensional stability to yield pleatability (as is apparent from FIGS. 2b and 3b).

The invention claimed is:

1. A crosslinked unreinforced cellulose hydrate membrane crosslinked at a temperature of 75° C. to 150° C. using at least two different crosslinking agents selected from diepoxide compounds having different spacer groups between the terminal epoxy groups, the cellulose hydrate membrane exhibiting a degree of crosslinking of 0.045 to 0.06, a dimensional change in membrane area in aqueous solutions of 25% or less, and an elongation at break according to DIN EN ISO 527-1 and DIN EN ISO 527-3 at a relative air humidity of 40% to 50% and at a temperature of 23° C. to 25° C. of 25% to 35%.

2. The crosslinked unreinforced cellulose hydrate membrane as claimed in claim 1, wherein the cellulose hydrate membrane is a microfiltration membrane or ultrafiltration membrane.

3. The crosslinked unreinforced cellulose hydrate membrane as claimed in claim 1, having a mean flow pore size of 0.1 μm to 0.6 μm.

4. The crosslinked unreinforced cellulose hydrate membrane as claimed in claim 1, wherein at least one alkanediol diglycidyl ether and at least one poly(ethylene glycol) diglycidyl ether and/or poly(propylene glycol) diglycidyl ether are used as crosslinking agents.

5. A method for producing a crosslinked unreinforced cellulose hydrate membrane, comprising:
providing a cellulose hydrate membrane;
crosslinking the cellulose hydrate membrane by impregnation with a crosslinker solution, the crosslinking being carried out in an aqueously alkaline solution comprising at least two different crosslinking agents selected from diepoxide compounds having different spacer groups between the terminal epoxy groups, the crosslinking being carried out at a temperature of 75° C. to 150° C. for 0.1 to 60 minutes, the cellulose hydrate membrane exhibiting a degree of crosslinking of 0.045 to 0.06, a dimensional change in membrane area in aqueous solutions of 25% or less, and an elongation at break according to DIN EN ISO 527-1 and DIN EN ISO 527-3 at a relative air humidity of 40% to 50% and at a temperature of 23° C. to 25° C. of 25%-35%;

following the crosslinking:

removing excess reactants and soluble reaction products by rinsing the membrane in an aqueous solution;

impregnating the membrane with a plasticizer solution; and drying the membrane, the drying being carried out at a temperature of 20° C. to 150° C.

6. The method as claimed in claim 5, wherein the cellulose hydrate membrane is obtained by saponification of a cellulose ester membrane in an aqueous medium.

7. The method as claimed in claim 6, wherein the saponification takes place in a sodium hydroxide-, potassium hydroxide- and/or lithium hydroxide-containing solution.

8. The method as claimed in claim 5, wherein the crosslinking is carried out at a temperature of 80° C. to 140° C. for 0.5 to 40 minutes.

9. The method as claimed in claim 5, further comprising the step of pleating of the crosslinked cellulose hydrate membrane.

10. A method for the filtration of aqueous media, the method comprising:

filtering aqueous media using a crosslinked unreinforced cellulose hydrate membrane crosslinked at a temperature of 75° C. to 150° C. using at least two different crosslinking agents selected from diepoxide compounds having different spacer groups between the terminal epoxy groups, the cellulose hydrate membrane exhibiting a degree of crosslinking of 0.045 to about 0.06, a dimensional change in membrane area in aqueous solutions of 25% or less, and an elongation at break according to DIN EN ISO 527-1 and DIN EN ISO 527-3 at a relative air humidity of 40% to 50% and at a temperature of 23° C. to 25° C. of 25% to about 35%.

11. The crosslinked unreinforced cellulose hydrate membrane as claimed in claim 1, wherein at least one alkanediol diglycidyl ether and at least one glycidyl ether are used as crosslinking agents, the at least one glycidyl either being represented by the following formula:

where n is 3 to 50 and R is hydrogen or a methyl group.

12. The crosslinked unreinforced cellulose hydrate membrane as claimed in claim 1, wherein the crosslinking is carried out for a time of between 0.1 minutes and 60 minutes.

13. The crosslinked unreinforced cellulose hydrate membrane as claimed in claim 1, wherein the crosslinking is carried out at a temperature of 80° C. to 140° C. for 0.5 minutes to 40 minutes.

14. The crosslinked unreinforced cellulose hydrate membrane as claimed in claim 1, wherein the crosslinking is carried out at a temperature of 80° C. to 140° C.

15. The crosslinked unreinforced cellulose hydrate membrane as claimed in claim 1, wherein the crosslinking is carried out at a temperature of 90° C. to 130° C.

16. The crosslinked unreinforced cellulose hydrate membrane as claimed in claim 1, wherein the crosslinking is carried out for a time of between 0.5 minutes and 40 minutes.

17. The crosslinked unreinforced cellulose hydrate membrane as claimed in claim 1, wherein the crosslinking is carried out using an aqueous alkaline solution.

18. The crosslinked unreinforced cellulose hydrate membrane as claimed in claim 1, wherein the crosslinked cellulose membrane is treated with a glycerol-containing solution of 0.5% to 30% by weight glycerol.

19. The crosslinked unreinforced cellulose hydrate membrane as claimed in claim 1, wherein the at least two crosslinking agents comprise a first crosslinking agent and a second crosslinking agent at a ratio of between 10-90 and 90-10.

20. The crosslinked unreinforced cellulose hydrate membrane as claimed in claim 1, wherein the at least two crosslinking agents comprise a first crosslinking agent and a second crosslinking agent at a ratio of between 20-80 and 80-20.

21. The crosslinked unreinforced cellulose hydrate membrane as claimed in claim 1, wherein the at least two crosslinking agents comprise a first crosslinking agent at a concentration of 0.01 mol/kg to 0.5 mol/kg and a second crosslinking agent at a concentration of 0.01 mol/kg to 0.5 mol/kg.

22. The crosslinked unreinforced cellulose hydrate membrane as claimed in claim 1, wherein the at least two crosslinking agents comprise a first crosslinking agent at a concentration of 0.05 mol/kg to 0.3 mol/kg and a second crosslinking agent at a concentration of 0.05 mol/kg to 0.3 mol/kg.

23. A crosslinked unreinforced cellulose hydrate membrane crosslinked at a temperature of 75° C. to 150° C. using BuDGE and PEG-DGE as crosslinking agents, the cellulose hydrate membrane exhibiting a degree of crosslinking of 0.045 to about 0.06, a dimensional change in membrane area in aqueous solutions of 25% or less, and an elongation at break according to DIN EN ISO 527-1 and DIN EN ISO 527-3 at a relative air humidity of 40% to 50% and at a temperature of 23° C. to 25° C. of 25% to about 35%.

24. The crosslinked unreinforced cellulose hydrate membrane as claimed in claim 1, wherein the elongation at break is between 25% and about 34%.

25. The crosslinked unreinforced cellulose hydrate membrane as claimed in claim 1, wherein the elongation at break is between 25% and about 33%.

26. The crosslinked unreinforced cellulose hydrate membrane as claimed in claim 1, wherein the elongation at break is between 25% and 33%.

* * * * *